UNITED STATES PATENT OFFICE.

FRIEDRICH MEYER, OF WILMINGTON, DELAWARE.

PROCESS OF MAKING BREWERS' YEAST.

SPECIFICATION forming part of Letters Patent No. 258,664, dated May 30, 1882.

Application filed February 28, 1882. (No specimens.)

*To all whom it may concern:*

Be it known that I, FRIEDRICH MEYER, a citizen of the United States of America, residing at Wilmington, in the county of New Castle and State of Delaware, have invented certain new and useful Improvements in a Process for Making Brewers' Yeast; and I do hereby declare the following to be a full, clear, and exact description of the invention, such as will enable others skilled in the art to which it appertains to make and use the same.

This invention has relation to a process for compounding brewers' yeast; and it consists in forming from hops, malt, and water under certain degrees of heat a first yeast, which is afterward used in certain proportions in another step or series of steps, wherein malt, water, and hops are again employed and subjected to heat at varying temperatures to form a second yeast, which is again employed with malt, water, and hops, subjected to heat as before and tested by a saccharometer, to form a third or stock yeast, which will last from four to six months, and from which, together with malt, hops, and water, a present-use yeast, which will last about one month, may be formed by compounding therewith malt, hops, and water at certain temperatures, all of which will be hereinafter fully pointed out in the body of the specification and claim.

In carrying out this process I take the proportions of about one-half ounce of hops to one-half gallon of boiling water, throw the hops into the yeast-can, and add the boiling water, and stir this mixture until the heat recedes to 190° Fahrenheit. I then add three quarts of cracked barley-malt and mash it well, after which I add one quart of boiling water and stir the mixture until the heat recedes to 160° Fahrenheit, when I cover the can and let the contents stand for five minutes. I then increase the heat by adding as little boiling water as possible until 176° Fahrenheit has been reached, when I again cover the can and let it stand for one hour, then cool the contents of the can by stirring them until the heat has receded to 90° Fahrenheit. I then put the liquid thus formed into a stone jar and place the jar into warm water at a temperature of about 80° or 90° Fahrenheit, and keep the heat of the water up to that point by using boiling water until the liquid has ceased to ferment, which will be from thirty-six to forty-eight hours. As this yeast will last only from six to eight hours, the preparations for the formation of the second yeast should be completed at this time.

To make the second yeast, I take one gallon (dry measure) of cracked barley-malt and put it in the yeast-can, and pour one-half gallon of boiling water thereon, and mash well together. This should be permitted to stand ten minutes, and then raised to a temperature of 176° Fahrenheit by adding boiling water to the amount of about three gallons. It should be then covered and permitted to stand for about one hour, after which it should be strained through a brass sieve into a clean tin can and placed on the stove, where it should boil for one hour and be skimmed during the operation of boiling. If one hour's boiling should prove to be insufficient, it may be boiled a little longer. It should register, when properly boiled, about 20° saccharometer, and the test should be made at 90° Fahrenheit. About two ounces of hops should then be added by stirring them in until the hops are thoroughly wetted, and the cover should be again replaced and the contents of the can boiled from three to five minutes longer. Remove the can from the stove and let it stand fifteen minutes, and then strain the contents of the can through a brass sieve into a stone jar, and cool it to about 94° Fahrenheit by setting the stone jar into cold water in the winter season. In summer it should be reduced to 90° Fahrenheit, as the natural temperature at this season will cause the temperature of the liquid to rise in a short time. Then add to the liquid thus produced one pint of the first yeast to each gallon of the liquid. Then wrap the jar in cloth, and set it away in a place where the temperature may be maintained at from 60° to 70° Fahrenheit until it is done fermenting, which will be about thirty-six hours. Then be ready to proceed to the formation of the third yeast, as this, which is termed the "second" yeast, will not keep longer than from ten to twelve hours.

To form the third yeast, I place four gallons of boiling water in the yeast-can and permit the heat to recede to 180° or 176° Fahrenheit. I then add about sixteen pounds of cracked barley-malt and mash well. The can is then rinsed down with about one-half gallon of boiling water and stirred until the temperature is about 150°, and then left to stand about ten minutes. Boiling water should then be added and the contents of the can stirred until the heat reaches 176° Fahrenheit, after which it should be covered and left to stand for one hour, and should then be strained through a brass sieve. Then take this liquid and place it in a clean tin can and set it on the stove and boil it from three to five hours, skimming it during the operation of boiling, until it becomes of a consistency of 38° saccharometer under a test at 90° Fahrenheit. Then put in one-half pound of hops and stir until the hops are thoroughly wetted, and then boil from three to five minutes longer. Remove the can from the stove, stir the contents, cover the can, and let it stand covered for about fifteen minutes, during which time it should be stirred occasionally, and then strained through a brass sieve into a clean yeast-can, and reduce its temperature to 91° Fahrenheit by placing the yeast-can into cold water. Then add one quart of the second yeast above described and stir well. The temperature during this stirring should be maintained at about 90° Fahrenheit. Then wrap the can in cloth and place it in a place where the temperature may be maintained at between 60° and 70° Fahrenheit until fermentation ceases, which will be about forty-eight hours. This yeast, called the "third yeast," will then be fit for use. This third or stock yeast will keep from four to six months, and should always be thoroughly shaken before using. This stock yeast is intended for shipment for use in making a fourth or present-use yeast, which, when made as hereinafter described, will keep about one month.

To make the fourth or present-use yeast, I take fifteen quarts of boiling water and place it in the tin yeast-can and let it reach a temperature of 176° Fahrenheit, and then place in it about sixteen pounds of cracked barley malt, mash well, and rinse down with about one quart of boiling water and stir until the temperature is about 150° Fahrenheit, then cover the can and let it stand about ten minutes. I then add boiling water until the temperature reaches 176° Fahrenheit, which requires about sixteen quarts of boiling water. I then let it stand one hour, after which I strain it through a brass sieve into a yeast-can. This can is then placed on the stone and boiled for about three hours to thicken it, care being taken to skim the contents during the operation of boiling. The proper consistency should be about 30° saccharometer under a test at 90° Fahrenheit. When at this consistency about six ounces of hops should be thoroughly stirred in, and the contents should be boiled from three to five minutes longer. The can should then be removed from the stove and left to stand for about fifteen minutes, during which time it should be stirred occasionally. It should then be strained through a brass sieve into a yeast-can, which should be placed in cool water, stirred, and reduced to a temperature of 90° Fahrenheit. One quart of the third or stock yeast should then be added by stirring it in under a temperature of 90° Fahrenheit, and the can wrapped up and placed in a position where a temperature of from 60° to 70° Fahrenheit can be maintained until fermentation ceases, which will be about forty-eight hours, after which it will be fit for use.

The superiority of this stock yeast over the yeast now employed lies in this, that it may be kept in stock for a period of six months, and from it a present-use yeast may be made that will last for a period of about one month, while the yeasts now employed will keep but a few hours at the furthest.

Having thus described my invention, what I claim as new, and desire to secure by Letters Patent of the United States, is—

The herein-described process of making a present-use yeast, consisting in first making a first yeast from hops, malt, and water in the proportions and at the temperatures described, then a second yeast from hops, malt, and water and the first yeast, as described, then making a third yeast from malt, hops, and water and the second yeast, as described, and compounding this third or stock yeast with malt, hops, and water to produce the fourth or present-use yeast, substantially as described.

In testimony whereof I affix my signature in presence of two witnesses.

FRIEDRICH MEYER.

Witnesses:
  THEO. MUNGEN,
  F. JANNUS.